A. S. CAMERON.
VALVE-GEAR FOR STEAM ENGINES.
No. 7,420. Reissued Dec. 12, 1876.
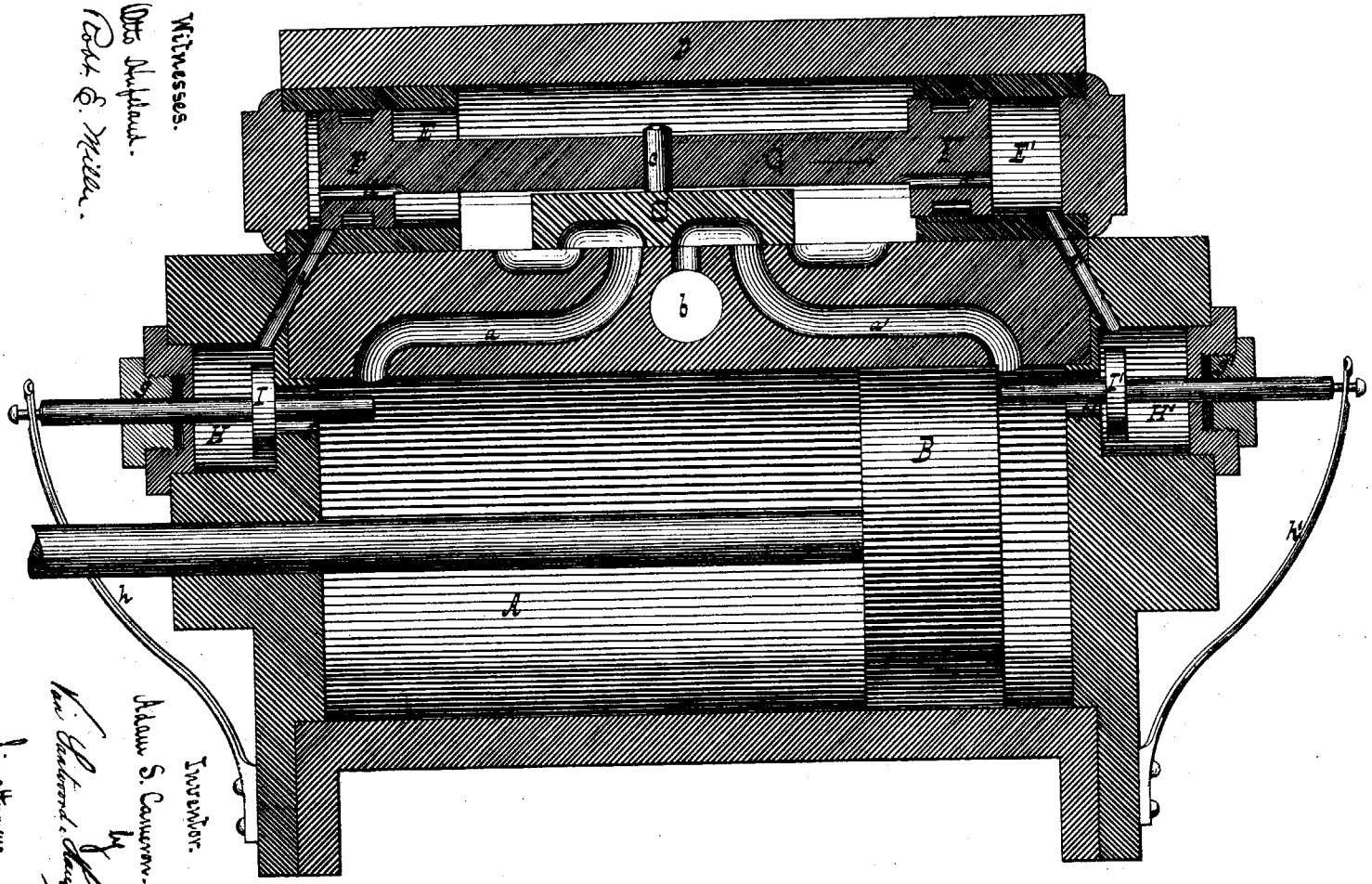
Witnesses.
Otto Hufland.
Robt. E. Miller.
Inventor.
Adam S. Cameron.
by
Van Santvoord & Hauff
his attorneys.
THE GRAPHIC CO. N.Y.

UNITED STATES PATENT OFFICE.

ADAM S. CAMERON, OF NEW YORK, N. Y.

IMPROVEMENT IN VALVE-GEARS FOR STEAM-ENGINES.

Specification forming part of Letters Patent No. 50,218, dated October 3, 1865; reissue No. 2,407, dated December 4, 1866; reissue No. 7,420, dated December 12, 1876; application filed October 11, 1876.

*To all whom it may concern:*

Be it known that I, ADAM S. CAMERON, of the city, county, and State of New York, have invented a new and useful Improvement in Valve-Gear for Steam-Engines, which improvement is fully set forth in the following specification, reference being had to the accompanying drawing, which represents a longitudinal central section of a steam-cylinder constructed according to this invention.

This invention relates to a valve-motion, which is produced by the direct action of the steam-piston on the stems of the puppet-valves which project into the interior of the steam-cylinder. With these puppet-valves, and with the main cylinder, are combined supplementary pistons, which carry the slide-valve, the whole being so constructed that the slide-valve is reversed before the main piston reaches the ends of the steam-cylinder, and that the main piston is cushioned or prevented from slamming against the cylinder-heads.

In the drawings, the letter A designates an ordinary steam-cylinder, provided with a piston, B. Steam is admitted to this cylinder through ports *a a*, and it exhausts through the port *b*, and these ports are opened and closed by the action of the slide-valve C, which is of the ordinary construction, and which may be arranged so as to admit steam under the valve, as shown in the drawing, or which may be constructed in any suitable manner.

The slide-valve is seated on the bottom of the steam-chest D, the ends of which form small cylinders E E′ to receive pistons F F′, which are connected to each other by a rod, G, and this rod is perforated transversely, so as to receive a stud, *c*, which rises from the back of the slide-valve C. Small channels *d d′*, passing through the supplementary pistons F F′, form a communication between the interior of the steam-chest and the outer ends of the supplementary cylinders E E′, so that said secondary pistons are exposed to a uniform pressure of steam from all sides. The supplementary cylinders E E′ communicate through channels *e e′* with chambers H H′, which communicate with the main cylinder by openings *f f′*. These openings are closed by puppet-valves I I′, the stems of which extend through the openings *f f′* into the interior of the cylinder, while from the outer faces of said valves extend rods, which are guided in stuffing-boxes *g g′*, and the outer ends of which are exposed to the action of springs *h h′*, said springs having a tendency to keep the puppet-valves closed. The area of the cross-sections of the channels *e e′* is much larger than that of the small channels *d d′* passing through the supplementary pistons F F′; and if the main piston approaches one end of its stroke, it strikes the stem of one of the puppet-valves—I′, for instance—and opens the same. The steam contained in the supplementary cylinder E′ is thereby allowed to escape through the channel *e′*, port *a′*, and exhaust-port *b*, and the equilibrium of the supplementary pistons is disturbed, causing said pistons to move in the direction of the arrows marked thereon in the drawing. By this motion the slide-valve is changed before the main piston has completed its stroke, and the steam admitted to the main cylinder cushions the piston, and causes it to complete its stroke and to begin its return-stroke with the least possible strain to the mechanism.

As soon as the main piston begins its return-stroke the valve I′ closes, and the equilibrium of the supplementary pistons is restored by the steam passing in through the small channel *d′*. The same action takes place at the opposite end of the stroke of the main piston, and the slide-valve is changed automatically by the action of the steam, itself governed by the direct action of the main piston on the puppet-valves I I′, and a valve-gear is obtained which works with the least possible friction, which is not liable to get out of order, and permits of running the main piston at a rapid speed.

It is obvious that the means employed for disturbing the equilibrium of the supplementary pistons can be changed in many different ways, and I do not wish to confine myself to the precise arrangement shown in the drawing.

What I claim as new, and desire to secure by Letters Patent, is—

1. The combination, with a steam-cylinder, with the piston working therein, with its main valve and with a valve-controlling piston, of two independent valves to be operated by the direct action of the piston, substantially as and for the purpose set forth.

2. The combination, with a steam-cylinder, the piston working therein, its main valve, and a valve-controlling piston, of two independent valves, the stems of which extend into the steam-cylinder, so that said valves shall be moved, reversing the main valve before the piston reaches the end of the cylinder, thereby cushioning said piston, as set forth.

3. The combination, with a steam-cylinder, the piston working therein, its main valve and a valve-controlling piston, of a valve situated in a chamber formed in the cylinder-head, the stem of said valve extending into the cylinder in line with the path of the piston, substantially as and for the purpose described.

4. The combination of valve-chambers H H′ and valves T T′, with the steam-cylinder A, supplementary cylinders E E′, pistons F F′, and main valve C, constructed and operating substantially as and for the purposes set forth.

In testimony that I claim the foregoing I have hereunto set my hand and seal this 9th day of October, 1876.

A. S. CAMERON.

Witnesses:
W. HAUFF,
E. F. KASTENHUBER.